Nov. 7, 1961   M. L. GONZALEZ   3,007,241
APPARATUS FOR REMOVING AXLE JOURNALS OF LAND VEHICLES
Filed May 19, 1959
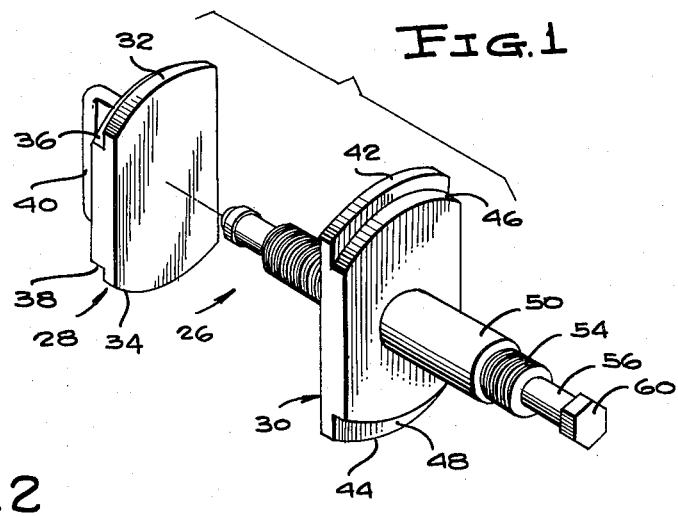
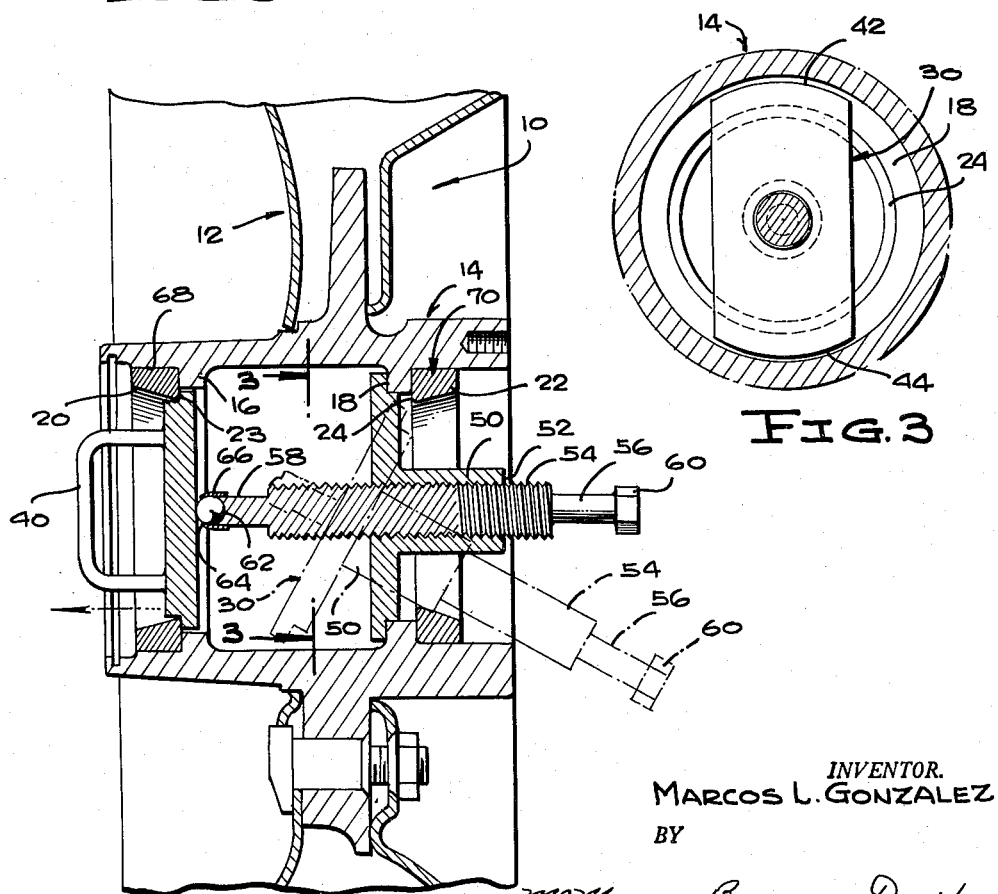
INVENTOR.
MARCOS L. GONZALEZ
BY
McMorrow, Berman & Davidson
ATTORNEYS

United States Patent Office 3,007,241 Patented Nov. 7, 1961

1

3,007,241
APPARATUS FOR REMOVING AXLE JOURNALS OF LAND VEHICLES
Marcos L. Gonzalez, Maryland Park, Md.
(507 65th Ave., Washington 27, D.C.)
Filed May 19, 1959, Ser. No. 814,309
1 Claim. (Cl. 29—266)

It is well known in the prior art that devices heretofore designed to remove axle bearings or journals from the hubs of the wheels of trailers, buses, trucks and other related vehicles is a time consuming process, and further, the means generally employed by the mechanics in removing such journals frequently results in damaging of the journal seats. In accordance with the teachings of the prior art, many attempts have been made to provide a suitable tool for the removal of the journals for the axles on opposite sides of the vehicle's wheel hubs, but all have signally failed to achieve their ultimate object in that the apparatus so devised was cumbersome, involved a number of working parts, and was impractical from the standpoint of cost and, in practically each instance, the devised apparatus was incapable of performing its assigned objectives.

Accordingly, one of the primary objects of this invention is to provide apparatus for removing the axle journals of the wheels of land vehicles in such a manner as to prevent destruction or marring of the journal seats while at the same time providing effective, positively actuated journal removing means which may be operated either manually or mechanically in a minimum length of time to displace and/or remove the worn journals of the hubs of wheels generally found in heavy duty land vehicles.

Another object of this invention is to provide apparatus of the type generally described above which requires but two moving parts to effect the separation of a land vehicle axle journal from the hub of a wheel.

A further object of this invention is to provide apparatus of the type generally referred to supra, wherein wheel journals of varying internal diameters may be quickly and easily displaced from their respective journal seats through the substitution of modifications of one or both of the aforementioned movable parts, the substitution requiring only a change in overall dimensions without change in configuration and/or functions.

This invention contemplates, as a still further object thereof, the provision of apparatus of the type referred to above which is non-complex in construction and assembly, inexpensive to manufacture, and durable in use.

Still another object of this invention is to provide journal removing apparatus which may be readily utilized by unskilled mechanics.

Other and further objects of the instant invention will become more evident from a consideration of the following specification, when read in conjunction with the annexed drawing, in which:

FIGURE 1 is an exploded perspective view of the apparatus provided for removing axle journals from the hubs of land vehicles, the apparatus being constructed in accordance with the instant invention;

FIGURE 2 is a medial cross-sectional view taken through the hub of a land vehicle and the apparatus illustrated in FIGURE 1 for effecting the removal of an axle journal; and, FIGURE 3 is a detail cross-sectional view taken substantially on the vertical plane of line 3—3 of FIGURE 2, looking in the direction of the arrows.

Referring now more specifically to the drawing, reference numeral 10 designates, in general, the rear wheel of a tractor, bus, trailer, or other related and similar

2 vehicles. The wheel 10 carries on its frame 12 at the outer periphery thereof a conventional tire (not shown) and has included therewith the usual substantially hollow cylindrical hub 14. The hub 14 has a substantially constant internal diameter throughout its length but is interrupted at longitudinally spaced intervals by a pair of circumferential flanges 16, 18 which, when taken in conjunction with the hub 14 serve as seats for the journals or bearings 20, 22. As is seen in FIGURE 2 of the drawing, the internal diameters of the journals or bearings 20, 22 are less than the internal diameters of their respective associated flanges 16, 18, to present exposed shoulders 23, 24.

The apparatus for removing the journals or bearings 20, 22 includes a pair of abutment plates 28, 30 having an elongated substantially rectangular configuration of which the plate 28 is formed with a pair of arcuately shaped ends 32, 34 having arcuately shaped shoulders 36, 38 formed therein and with a handle member 40 projecting laterally from the recessed side thereof.

In the same manner the abutment plate 30 is provided with opposed arcuately shaped ends 42, 44 which are provided with arcuately shaped 46, 48, respectively. The arcuately shaped ends of the plates are on a diameter substantially greater than the width of the plates, as is clearly shown in FIGURE 1, which facilitates the insertion of the plates into their operating positions.

The plate 30 is formed with a laterally projecting substantially hollow cylindrical centrally disposed sleeve 50 and both are internally threaded at 52 to receive therethrough an externally threaded bolt 54. The opposed ends of the bolt 54 are reduced in diameter to form a pair of shanks 56, 58 of which the outer end of the shank 56 terminates in an enlarged bolt head 60 adapted for engagement with a manually operated or mechanically operated tool of conventional design to effect rotation thereof. The outer end of the shank 58 is formed with a recessed bearing seat 62 to receive a ball bearing 64 which is retained in the seat 62 by means of a retaining cap 66 which is telescoped over the outer end of the shank 58.

To utilize and to explain the operation of the above described apparatus reference is made specifically to FIGURE 2 of the drawing, and it will be understood by those skilled in this art that the following described mode of operation need not take place in the sequential steps to be described and that the several steps leading to the removal of axle journals may be varied at the discretion of the user.

To utilize the above described apparatus, let it be assumed that the abutment plate 30 has been threaded with the bolt 54. The plate 30 together with its associated bolt 54 is then turned at an acute angle with respect to the longitudinal axis of the hub 14 in such a manner as to permit the arcuately shaped ends 42, 44 of the abutment plate 30 to clear the circumferential flange 18. The method of insertion as thus far described is shown in phantom lines in FIGURE 2. Thereafter, the longitudinal axis of the bolt 56 is moved upwardly to coincide with the longitudinal axis of the hub 14 and the abutment plate is then moved to the right (as viewed in FIGURE 2) until the flange 18 engages in the recesses 46, 48 of the abutment plate 30. In this position, the bolt 54 is backed away from the journal 20 to permit the insertion of the abutment plate 28, the operator, in this latter step, grasping the handle 40 and tilting the abutment plate 28 in such a manner as to permit the arcuately shaped ends 32, 34 thereof to pass below the exposed shoulder 23 of the journal 20. After the abutment plate 28 has been inserted within the hub 14 the angularity thereof is changed so that the longitudinal and transverse diameters of the abutment plate 28 extend perpendicularly to the longitudinal axis of the hub 14. The user then pulls on the handle 40 until the exposed shoulder 23 is engaged by the shoulders 36, 38 of the abutment plate 28.

The bolt 54 is then turned in a clockwise direction to advance the shank 58 relative to the abutment plate 30 to cause the ball bearing 64 to engage against the proximate side of the abutment plate 28. Continued advance of the bolt 54 will cause the journal or bearing 20 to move in a direction axially and outwardly with respect to the axis of the hub 14 from its bearing seat 68 for eventual complete disengagement therefrom.

Subsequent to the complete removal of the journal 20 from its seat 68, the abutment plate 28 may be manually removed from the flange 16 since the longitudinal diameter of the plate 28 is less than the internal diameter of the flange 16.

The bolt 54 is now backed away from the flange 16, and thereafter the plate 30, its associated elements, and component parts, are again tilted to the phantom line position shown in FIGURE 2, whereby the plate 30 may be drawn through the flange 18.

To effect the withdrawal of the journal 22 from its journal seat 70 the relative positions of the plates 28, 30 are reversed with the plate 28 now being disposed within the hub 18 and bearing against the shoulder 24 of the journal 22 and wherein the plate 30 locks behind the flange 16. Force is now exerted on the plate 30 in the manner described above to effect the forward movement of the journal 22 from its associate seat 70.

It is important to note at this point that the opposed journals, through the operation of the above described tool or instrument may be removed quickly and efficiently thereby materially reducing maintenance costs. It should also be observed that due to the differing diameters of the flanges 16, 18 it may be necessary to substitute a second abutment plate 28 for the original one thereof wherein the second of the plates has a smaller longitudinal dimension. However, in servicing a fleet of trailers or other similar vehicles of conventional design, only a single pair of abutment plates 28, 30 need be made.

Having described and illustrated one embodiment of this invention in detail, it will be understood that the same is offered merely by way of example, and that this invention is to be limited only by the scope of the appended claim.

What is claimed is:

Apparatus for removing an annular bearing or journal from the hub of a vehicle wheel of a type which includes a pair of axially-spaced, inwardly-extending, annular flanges against an outwardly-facing side of one of which is juxtaposed said journal, said journal having a portion of smaller diameter than the inside diameter of the juxtaposed flange providing a surface against which an abutment plate may engage, said apparatus comprising an elongated abutment plate, the narrower dimension of such abutment plate being such as to permit it to be inserted through said journal and the longer dimension being greater than the internal diameter of said journal, the outer ends of said abutment plate, at its longer dimension, providing abutment surfaces adapted to overlie and bear against the inner edge portion of said journal, a second elongated abutment plate, the narrower dimension of said second abutment plate being such as to permit it to be inserted through said other flange and the longer dimension being greater than the internal diameter of said other flange, the outer ends of said second abutment plate, at its larger dimension, providing abutment surfaces adapted to overlie and bear against the inwardly-facing side of said other flange, said second abutment plate having a threaded opening extending therethrough, and a threaded, pressure-applying bolt extending through said second abutment plate and in threaded engagement with the threads of said opening, the rotation of said bolt inwardly through said second abutment plate causing the inner end of said bolt to engage said first abutment plate, to cause said second abutment plate to engage against said other flange and thereafter to apply a force against said first abutment plate to remove said journal.

References Cited in the file of this patent

UNITED STATES PATENTS

| | | |
|---|---|---|
| 1,879,335 | Kulp | Sept. 27, 1932 |
| 2,093,219 | Tolland | Sept. 14, 1937 |
| 2,305,076 | Graham | Dec. 15, 1942 |
| 2,424,681 | Eberhart | July 29, 1947 |
| 2,430,847 | Kirk et al. | Nov. 11, 1947 |
| 2,876,533 | Oberley et al. | Mar. 10, 1959 |

FOREIGN PATENTS

| | | |
|---|---|---|
| 1,111,638 | France | Nov. 2, 1955 |